(12) United States Patent
Bell et al.

(10) Patent No.: US 12,043,456 B2
(45) Date of Patent: Jul. 23, 2024

(54) LATCHING MECHANISMS, STORAGE RECEPTACLES WITH LATCHING MECHANISMS, AND METHODS OF MANUFACTURING AND USING THE SAME

(71) Applicant: United Parcel Service of America, Inc., Atlanta, GA (US)

(72) Inventors: Julian Leland Bell, Decatur, GA (US); Stephens B. Woodrough, Jr., Peachtree Corners, GA (US); Justin Ashtiani, Lithonia, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 371 days.

(21) Appl. No.: 17/404,849

(22) Filed: Aug. 17, 2021

(65) Prior Publication Data

US 2023/0053419 A1 Feb. 23, 2023

(51) Int. Cl.
*B65D 43/22* (2006.01)
*B65D 43/16* (2006.01)
(Continued)

(52) U.S. Cl.
CPC .......... *B65D 43/22* (2013.01); *B65D 43/163* (2013.01); *E05C 19/009* (2013.01); *E05B 63/121* (2013.01)

(58) Field of Classification Search
CPC .... Y10T 292/14; Y10T 292/11; Y10T 292/42; Y10T 292/432; Y10T 292/1022;
(Continued)

(56) References Cited

U.S. PATENT DOCUMENTS

| 761,962 | A | * | 6/1904 | Hill | ........................ | A45C 13/04 |
| | | | | | | 150/121 |
| 860,183 | A | * | 7/1907 | Barr | .................... | B65D 88/1618 |
| | | | | | | 383/34.1 |

(Continued)

FOREIGN PATENT DOCUMENTS

| AT | 12352 U1 | * | 2/2012 | ......... | A44B 11/2553 |
| CN | 110477525 A | * | 11/2019 | ......... | A44B 11/2519 |

(Continued)

OTHER PUBLICATIONS

International Search Report and Written Opinion received for PCT Patent Application No. PCT/US2022/039422, mailed on Nov. 18, 2022, 12 pages.

*Primary Examiner* — Kristina R Fulton
*Assistant Examiner* — Steven A Tullia
(74) *Attorney, Agent, or Firm* — Shook, Hardy & Bacon L.L.P.

(57) ABSTRACT

Latching mechanisms, storage receptacles with latching mechanisms, and methods of manufacturing and using the same are disclosed. In one aspect, the latching mechanism includes a first latching element, a second latching element, and a ball-locking mechanism. The ball-locking mechanism allows the first latching element to be releasably secured to the second latching element. The latching mechanism may be integrated with a frame, which may be adjustable, and which may further be integrated with a storage receptacle, e.g., one that has a storage compartment and an opening. The components of the latching mechanism may be shaped, sized, or otherwise configured to enable, and facilitate, automated and/or semi-automated handling and manipulation. The latching mechanisms, storage receptacles, and associated handling systems described herein may be used in a logistics network operation.

19 Claims, 9 Drawing Sheets

(51) Int. Cl.
*E05B 63/12* (2006.01)
*E05C 19/00* (2006.01)

(58) Field of Classification Search
CPC ......... Y10T 292/1023; Y10T 292/1024; Y10T 292/1028; Y10T 292/1038; Y10T 292/68; Y10T 292/683; Y10T 292/685; Y10T 292/688; Y10T 292/691; Y10T 292/71; Y10T 24/45524; Y10T 24/45529; B65D 43/22; B65D 43/163; B65D 45/16; B65D 45/18; B65D 45/20; B65D 45/22; B65D 33/02; B65D 33/1658; B65D 33/1675; E05B 15/006; E05B 15/0073; E05B 47/0038; E05B 47/004; E05B 17/2011; E05B 63/12; E05B 63/121; E05B 65/52; E05B 65/5207; E05B 65/5215; E05B 65/5273; E05B 65/523; E05B 65/5238; E05B 65/5284; E05C 19/009; E05C 19/04; Y10S 292/48; Y10S 292/50; A44B 11/2592
USPC ................... 220/9.2, 9.3; 383/34–34.1, 86.1
See application file for complete search history.

(56) References Cited

U.S. PATENT DOCUMENTS

| | | | | |
|---|---|---|---|---|
| 966,695 | A * | 8/1910 | Lincoln | A01M 31/00 383/34.1 |
| 1,089,891 | A * | 3/1914 | Woolley | E05C 19/04 292/15 |
| 1,408,637 | A * | 3/1922 | Pratt | E05C 19/04 292/73 |
| 1,635,144 | A * | 7/1927 | Stevens, Jr. | E05B 47/0002 335/289 |
| 2,789,781 | A * | 4/1957 | Miller | A45C 13/04 248/101 |
| 3,696,744 | A * | 10/1972 | Etchell | B41F 27/1231 101/415.1 |
| 3,757,551 | A * | 9/1973 | Willach | E05B 47/0038 70/276 |
| 3,802,230 | A * | 4/1974 | Tickett | E05B 35/00 70/34 |
| 3,914,965 | A * | 10/1975 | Paxton | E05B 67/365 292/281 |
| 4,154,167 | A * | 5/1979 | Czinger | B41F 27/1231 101/415.1 |
| 4,453,449 | A * | 6/1984 | Hollmann | F41F 3/052 403/322.2 |
| 4,468,843 | A * | 9/1984 | Duclos | A44B 11/2534 24/642 |
| 4,639,163 | A * | 1/1987 | Buthe | F16D 1/116 403/322.2 |
| 4,815,304 | A * | 3/1989 | Kesselman | E05B 15/16 70/276 |
| 4,815,866 | A * | 3/1989 | Martone | B65B 67/1238 141/390 |
| 4,875,299 | A * | 10/1989 | Mabboux | A43B 5/0458 24/578.15 |
| 5,207,544 | A * | 5/1993 | Yamamoto | E05B 63/121 411/21 |
| 5,494,323 | A * | 2/1996 | Huang | E05B 63/121 24/453 |
| 6,014,796 | A * | 1/2000 | Harrison | A44B 11/2546 24/642 |
| 6,185,103 | B1 * | 2/2001 | Yamada | G11B 33/1493 |
| 6,684,670 | B1 * | 2/2004 | Agbay | E05B 67/365 70/164 |
| 7,264,284 | B2 * | 9/2007 | Hsu | E05C 19/04 292/9 |
| 7,325,844 | B2 * | 2/2008 | Salice | E05C 19/022 292/132 |
| 7,364,238 | B2 * | 4/2008 | Higgs | A47C 1/023 297/383 |
| 8,549,724 | B2 * | 10/2013 | Davies | F16B 19/1081 411/21 |
| 9,228,387 | B2 * | 1/2016 | Header | E05F 5/02 |
| 9,724,830 | B2 * | 8/2017 | Norton | B23B 31/22 |
| 10,024,082 | B2 * | 7/2018 | Marsh | E05B 37/00 |
| 10,368,615 | B2 * | 8/2019 | Zhang | A44B 11/2519 |
| 10,822,834 | B2 * | 11/2020 | Holcomb | E05B 9/084 |
| 11,255,114 | B2 * | 2/2022 | Konrad | E05B 83/40 |
| 11,603,871 | B2 * | 3/2023 | Wang | F16B 1/04 |
| 2003/0110907 | A1 | 6/2003 | Hu | |
| 2006/0071484 | A1 * | 4/2006 | Chen | E05B 63/121 292/336.3 |
| 2012/0087723 | A1 * | 4/2012 | Shafer | F16B 21/165 403/361 |
| 2012/0288325 | A1 * | 11/2012 | Blanchard | F16B 21/165 403/322.2 |
| 2012/0291501 | A1 * | 11/2012 | Gentile | E05B 67/365 70/276 |
| 2014/0250639 | A1 | 9/2014 | Siwak | |
| 2016/0236826 | A1 * | 8/2016 | Hoskins | B65D 33/1675 |
| 2016/0290011 | A1 * | 10/2016 | Gentile | E05B 47/0045 |
| 2019/0119955 | A1 * | 4/2019 | Agbay | E05B 21/06 |
| 2020/0109806 | A1 * | 4/2020 | Stachowiak | F16L 37/08 |
| 2020/0347645 | A1 * | 11/2020 | Shaw | E05B 73/00 |
| 2022/0339797 | A1 * | 10/2022 | Sato | B25J 15/0416 |
| 2023/0053419 | A1 * | 2/2023 | Bell | B65D 43/22 |

FOREIGN PATENT DOCUMENTS

| | | | | |
|---|---|---|---|---|
| DE | 202008000459 U1 * | 6/2009 | | E05B 47/0002 |
| DE | 202017100157 U1 * | 1/2018 | | E05B 63/0056 |
| DE | 102018101602 A1 * | 7/2019 | | E05B 17/2046 |
| EP | 0181684 B1 * | 8/1985 | | B65B 67/1244 |
| FR | 2559858 A3 * | 2/1984 | | E05B 63/121 |
| FR | 2803866 A1 * | 7/2001 | | B60N 2/01533 |
| FR | 2807366 A1 * | 10/2001 | | B60N 2/01533 |
| GB | 2444933 A * | 6/2008 | | D06F 37/42 |
| JP | 2014210587 A * | 11/2014 | | B65D 33/02 |
| KR | 20050082452 A * | 2/2004 | | E05B 47/0045 |
| KR | 20220145774 A * | 4/2022 | | B25J 15/00 |
| WO | 2009/027734 A2 | 3/2009 | | |
| WO | 2021/006801 A1 | 1/2021 | | |
| WO | WO-2021161299 A1 * | 8/2021 | | B65D 33/1658 |

* cited by examiner

LATCHING MECHANISMS, STORAGE RECEPTACLES WITH LATCHING MECHANISMS, AND METHODS OF MANUFACTURING AND USING THE SAME

TECHNICAL FIELD

The field relates to latching devices.

BACKGROUND

Transporting objects, e.g., in a logistics network, presents unique challenges. For example, objects are often transported in storage receptacles, e.g., bags or other carriers, that enclose and secure the objects during transit. However, with the increase in automated and semi-automated handling, storage receptacles that more effectively support such operations, while also providing suitable securement for objects, are needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, latching mechanisms, storage receptacles with latching mechanisms, and methods of manufacturing and using the same. The embodiments described herein are configured to enable, facilitate, and support automated and/or semi-automated operations. In one embodiment, a latching mechanism is provided. The latching mechanism includes a first latching element, which may be elongated, a second latching element, which may be elongated, and a ball-locking mechanism. The ball-locking mechanism allows the first latching element and the second latching element to be releasably secured. The latching mechanism may be integrated into a frame that is adjustable. The frame may be integrated into a storage receptacle, e.g., one having a storage compartment and an opening. The components of the latching mechanism, the frame, and/or the storage receptacle may be shaped, sized, and/or otherwise configured to support automated or semi-automated handling and manipulation, e.g., by an automated handling system. This may facilitate automated or semi-automated processing, e.g., in a logistics network operation.

The term "storage receptacle," as used herein, should be interpreted broadly, to include any structure used to hold one or more objects. The "storage receptacles" described herein may include rigid components, non-rigid components, semi-rigid components, pliable components, elastic components, and/or other components, structures, or features or combinations of the same. The "storage receptacles" described herein may also be any shape or size.

The term "logistics network," as used herein, should also be interpreted broadly, to include any one, or combination, of persons, equipment, locations, and/or mobile transports (e.g., vehicles, ships, aircraft, railway transports, or the like, including those that operate autonomously or semi-autonomously) used to transfer objects to different locations.

BRIEF DESCRIPTION OF THE DRAWINGS

The embodiments in this disclosure that relate to latching mechanisms, storage receptacles with latching mechanisms, and methods of manufacturing and using the same, are described in detail below with reference to the attached drawing figures, which are intended to illustrate only non-limiting examples, wherein.

DETAILED DESCRIPTION

This detailed description is provided in order to meet statutory requirements. However, this description is not intended to limit the scope of the invention discussed herein. Rather, the claimed subject matter may be embodied in other ways, to include different steps, combinations of steps, different features, and/or different combinations of features, similar to those described in this disclosure, and in conjunction with other present or future technologies. In addition, although the terms "step" and "block" may be used herein to identify different elements of methods employed, the terms should not be interpreted as implying any specific order to the different elements, except when the order is explicitly stated.

In general, this disclosure describes latching mechanisms, storage receptacles with latching mechanisms, and methods of manufacturing and using the same. The aforementioned embodiments may enable, facilitate, and support automated and/or semi-automated handling operations. In one embodiment, a latching mechanism is provided. The latching mechanism may include a first latching element, a second latching element, and a ball-locking mechanism. The ball-locking mechanism allows the first latching element to be releasably secured to the second latching element. In another embodiment, the latching mechanism may be integrated into a frame that is adjustable, e.g., between an open configuration and a closed configuration. In an additional embodiment, the frame may be integrated with a storage receptacle, e.g., at an opening thereof. The storage receptacles may each include a corresponding storage compartment formed of different materials, rigidities, and/or pliabilities, in different embodiments. The latching mechanism, and components thereof, may be shaped, sized, and adapted to enable or support automated or semi-automated handling and manipulation. Further embodiments are discussed below in connection with FIGS. 1-10.

Figure 1:
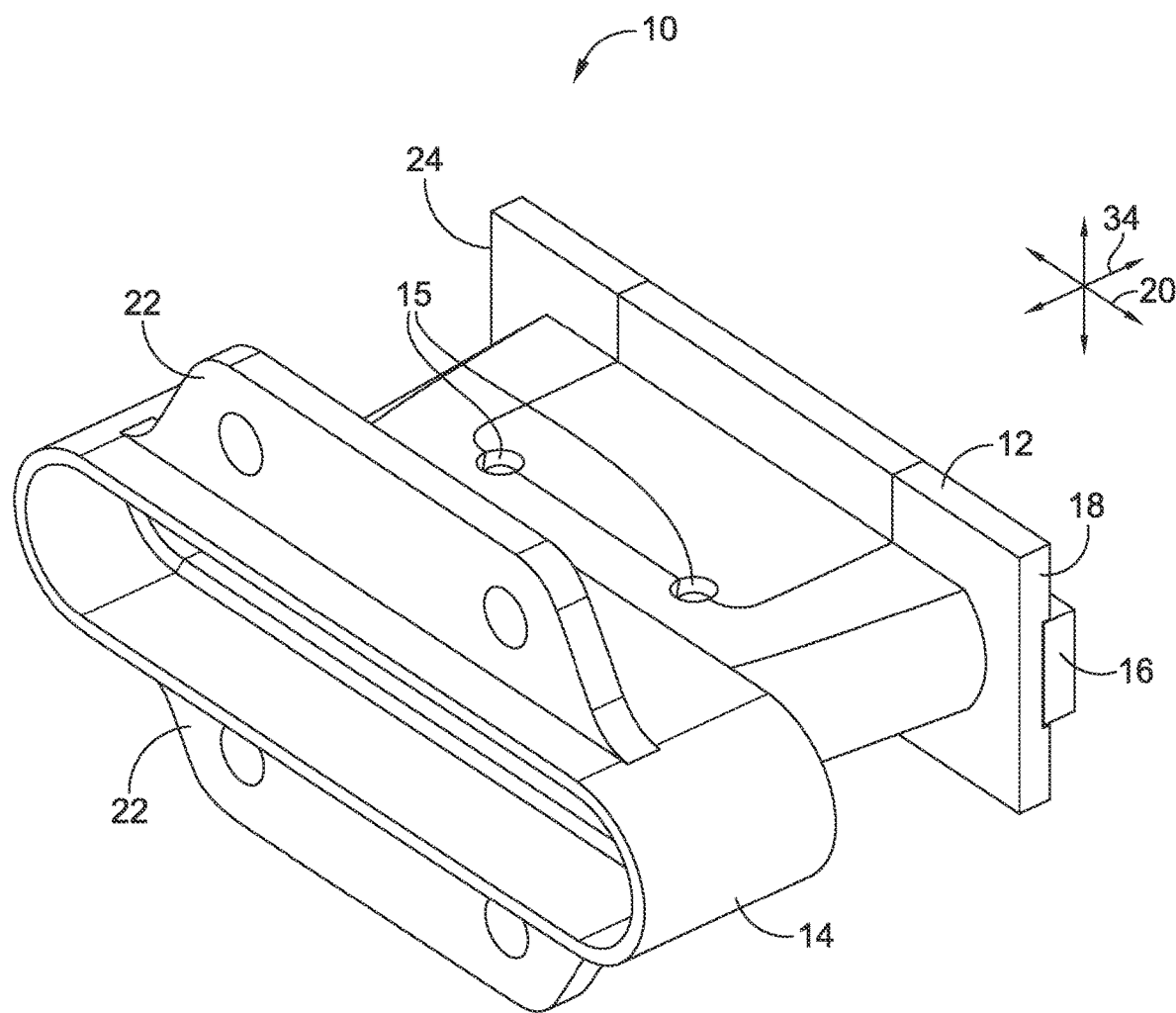
FIG. 1 depicts a latching mechanism, in accordance with an embodiment hereof.

Looking at FIG. 1, a latching mechanism 10 is shown, in accordance with an embodiment hereof. The latching mechanism 10 includes a latching element 12, a latching element 14, and a ball-locking mechanism 15. The ball-locking mechanism 15 is mostly obscured in FIG. 1 due to it being primarily internal to the latching mechanism 10, and is shown in greater detail in FIGS. 6A-6B and FIGS. 7A-7B.

Looking still at FIG. 1, it can be seen that the latching elements 12, 14 are distinct structures. In addition, the latching element 12 is insertable into the latching element 14. This insertion allows the ball-locking mechanism 15, along with internal operation, to secure the latching elements 12, 14 together. To operate the ball-locking mechanism 15, the latching element 12 has a structure 16 and a structure 18. The structure 16 is shiftable, e.g., slidable, within the structure 18. This shifting of the structure 16 operates the ball-locking mechanism 15, as described further in connection with FIGS. 7A-7B. The latching elements 12, 14 also each include a corresponding plate 22, 24. The plates 22, 24 may provide or impart stability, e.g., by reducing or limiting moment forces that occur when the latching elements 12, 14 are manipulated, e.g., by components of an automated handling system.

Figure 2:
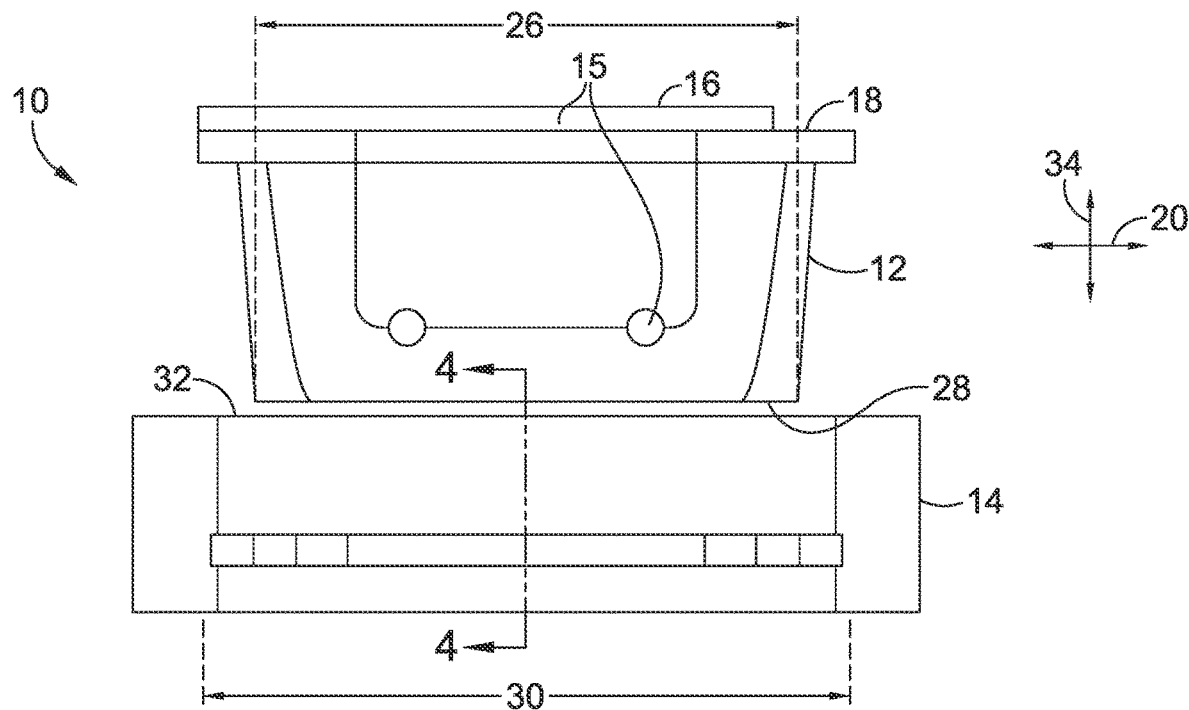
FIG. 2 depicts an elevation view of the latching mechanism of FIG. 1, in accordance with an embodiment hereof.

Looking at FIG. 2, an elevation view of the latching mechanism 10 is shown, in accordance with an embodiment hereof. FIG. 2 again shows the latching element 12 and the latching element 14. The latching element 12 includes a distal end 28 and the latching element 14 includes an opening 32. The opening 32 is sized and shaped to receive the distal end 28 of the latching element 12. The distal end 28 of the latching element 12 has a width 26, and in addition the opening 32 of the latching element 14 has a width 30, as measured along the axis 20 shown in FIG. 2. It can be seen that the width 26 is less than the width 30. This allows the latching element 12 to be inserted into the latching element 14. In different embodiments, this width difference between the distal end 28 and the opening 32 may vary. For example, this width difference may be 0.1, 0.2, 0.3, 0.4, 0.5, 1, 2, 3, 4, 5, 6, 7, 8, 9, or 10 millimeters ("mm"), or more, in different aspects.

The latching elements 12, 14 shown in FIGS. 1-2 each have an elongated shape. In some aspects, the latching element 12 may have a blade-like or tombstone-like elongated shape, and the opening 32 of the latching element 14 may have a generally corresponding oval, elliptical, or racetrack-like shape, to facilitate easier alignment along at least one axis, e.g., the axis 20 as shown in FIG. 2. Furthermore, as shown in FIG. 2, the latching element 12 may have a tapered contour or shape, e.g., being narrower at the distal end 28 compared to the opposite end, as measured along the axis 20 shown in FIG. 2. This configuration in general facilitates insertion of the distal end 28 into the opening 32 by providing a degree of clearance between the distal end 28 and the opening 32, e.g., at the moment the latching element 12 is inserted into the latching element 14. In addition, the latching element 12 may have a contour and/or shape such that, as the latching element 12 progresses into the latching element 14, the clearance between the corresponding structures decreases, such that when the latching elements 12, 14 are "latched," the latching element 12 will be precisely located relative to the latching element 14, within a selected tolerance. This configuration in general facilitates insertion of the distal end 28 into the opening 32. This configuration may also reduce moment forces during handling. In addition, the shape (e.g., elongated), contours (e.g., inwardly curved), and width differential of the latching elements 12, 14 may result in the latching mechanism 10 being more tolerant to misalignment along the axis 20 during insertion of the latching element 12 into the latching element 14 along the axis 34. This attribute may be particularly beneficial when the latching elements 12, 14 are being manipulated using automated mechanisms, where perfect spatial alignment of the latching elements 12, 14 may be inconsistent or otherwise difficult to achieve.

Figure 3:
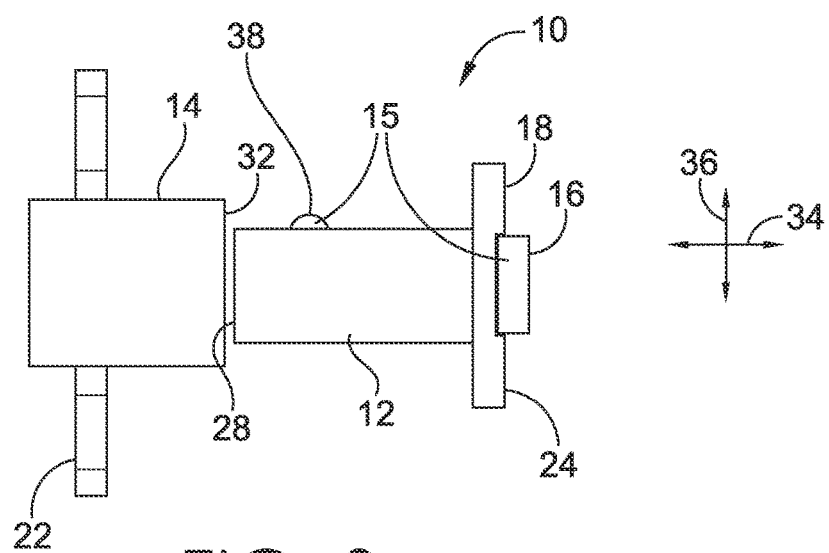
FIG. 3 depicts another elevation view of the latching mechanism of FIG. 1, in accordance with an embodiment hereof.

Looking at FIG. 3, another elevation view of the latching mechanism 10 is shown, in accordance with an embodiment hereof. FIG. 3 depicts the difference in height between the opening 32 of the latching element 14 and the distal end 28 of the latching element 12, measured along the axis 36. In different embodiments, this height differential may vary. This once again may enable easier alignment and insertion, e.g., providing greater tolerance for misalignment, which again supports manipulation using various automated systems. FIG. 3 also depicts a ball 38 that is part of the ball-locking mechanism 15. The ball 38 is enclosed, at least partially, within the latching element 12, and shifts to either secure the latching element 12 within the latching element 14, or to release the latching element 12 from the latching element 14, as described further in connection with FIGS. 4A-4C.

Figure 4A:
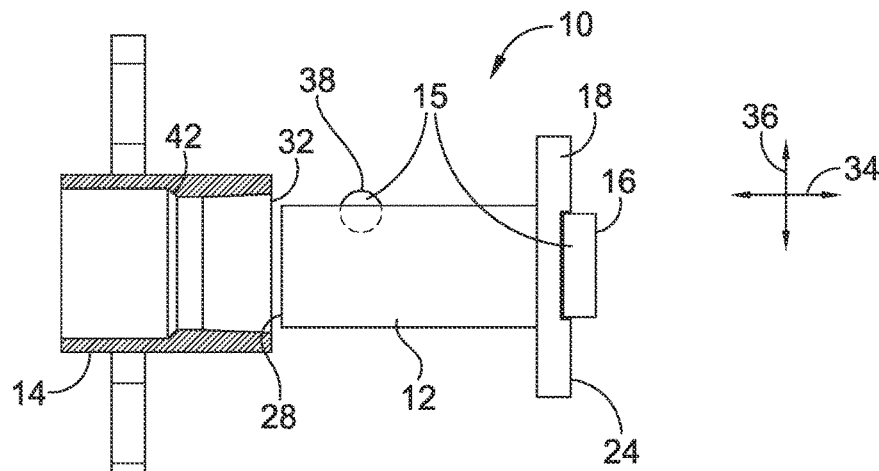
FIGS. 4A-4C depict separate elevation views of the latching mechanism of FIG. 1, in accordance with an embodiment hereof.
Figure 4B:
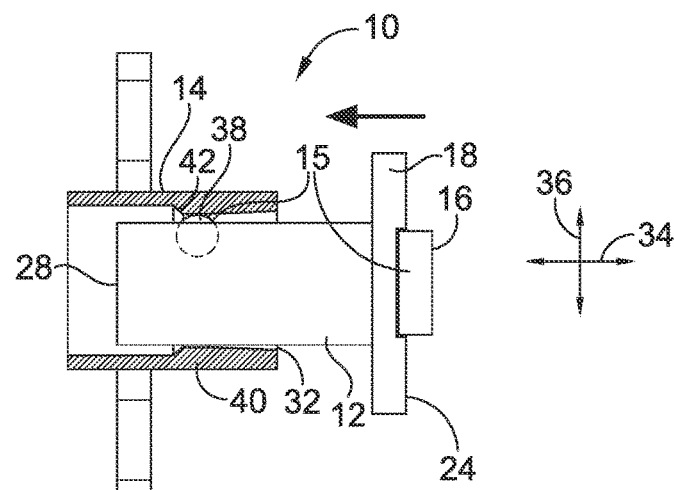
Figure 4C:
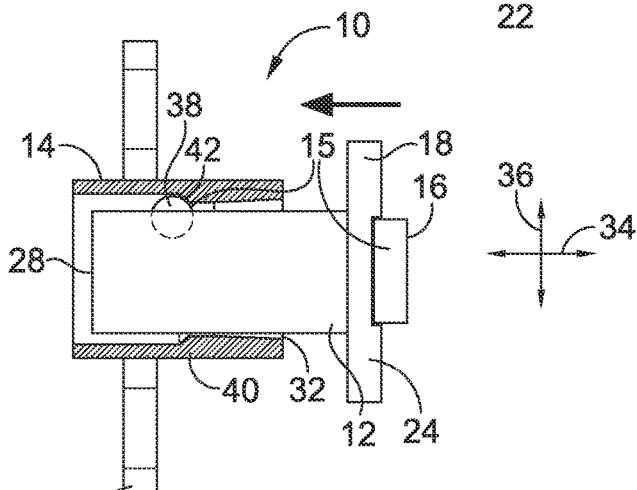

Looking at FIGS. 4A-4C, several cross-sections of the latching mechanism 10 are shown, in accordance with an embodiment hereof. FIG. 4A generally depicts the latching element 12 and the latching element 14 spaced apart from each other. FIG. 4B generally shows the latching element 12 partially inserted into the latching element 14. In particular, in FIG. 4B, the distal end 28 is inserted through the opening 32, such that an enclosure 40 defining part of the latching element 14 surrounds the distal end 28. FIG. 4B also shows the ball-locking mechanism 15 operated so that the ball 38 is shifted towards an interior of the latching element 12. This allows the latching element 12 to be inserted into the enclosure 40 with minimal interference between the ball 38 and the enclosure 40. FIG. 4C generally depicts the latching element 12 inserted substantially fully into the latching element 14. In addition, looking at FIG. 4C, the ball-locking mechanism 15 has been released so that the ball 38 is shifted outward, along the axis 36. This results in the ball 38 shifting into interference with a locking feature 42 located on an internal surface of the enclosure 40. In this example embodiment, the locking feature 42 is an edge, protrusion, lip, and/or other structure that restricts the ball 38 from moving toward the opening 32 along the axis 34. This also restricts, by association, the latching element 12 from moving in this direction. This "interference position" or "interference configuration" allows the latching element 12 to remain releasably secured within the latching element 14.

Figure 5A:
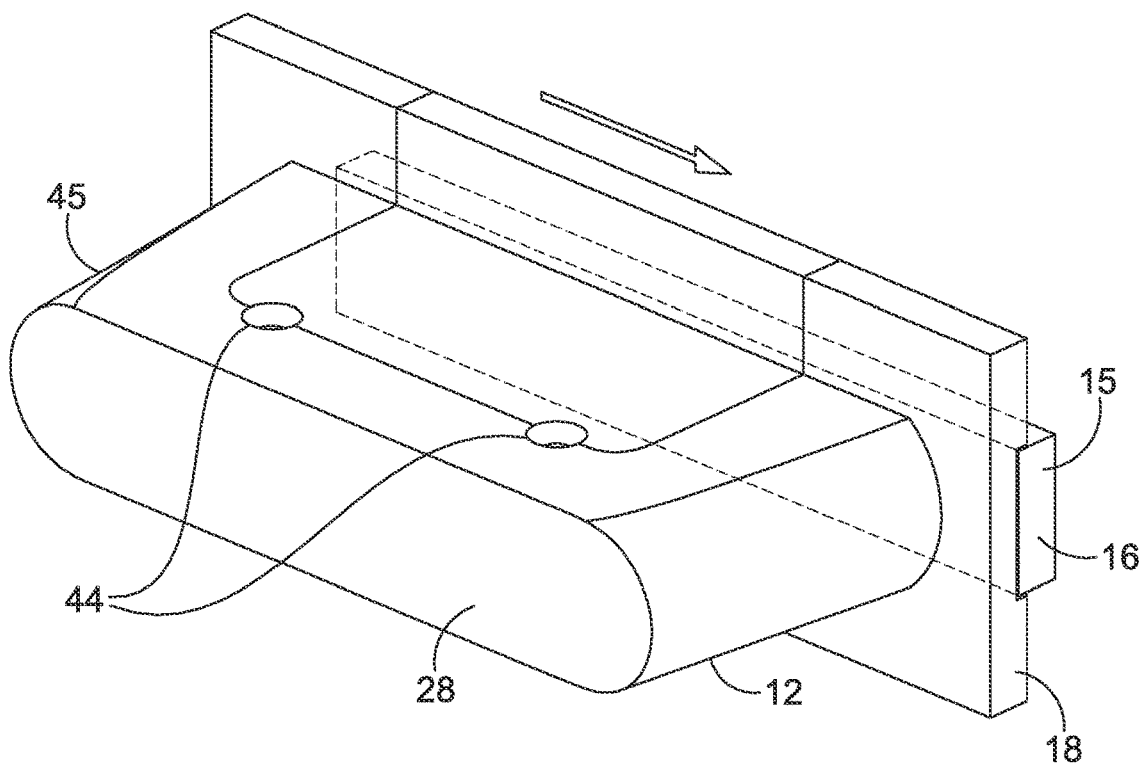
FIGS. 5A-5B depict an example process of operating the latching mechanism of FIG. 1, in accordance with an embodiment hereof.
Figure 5B:
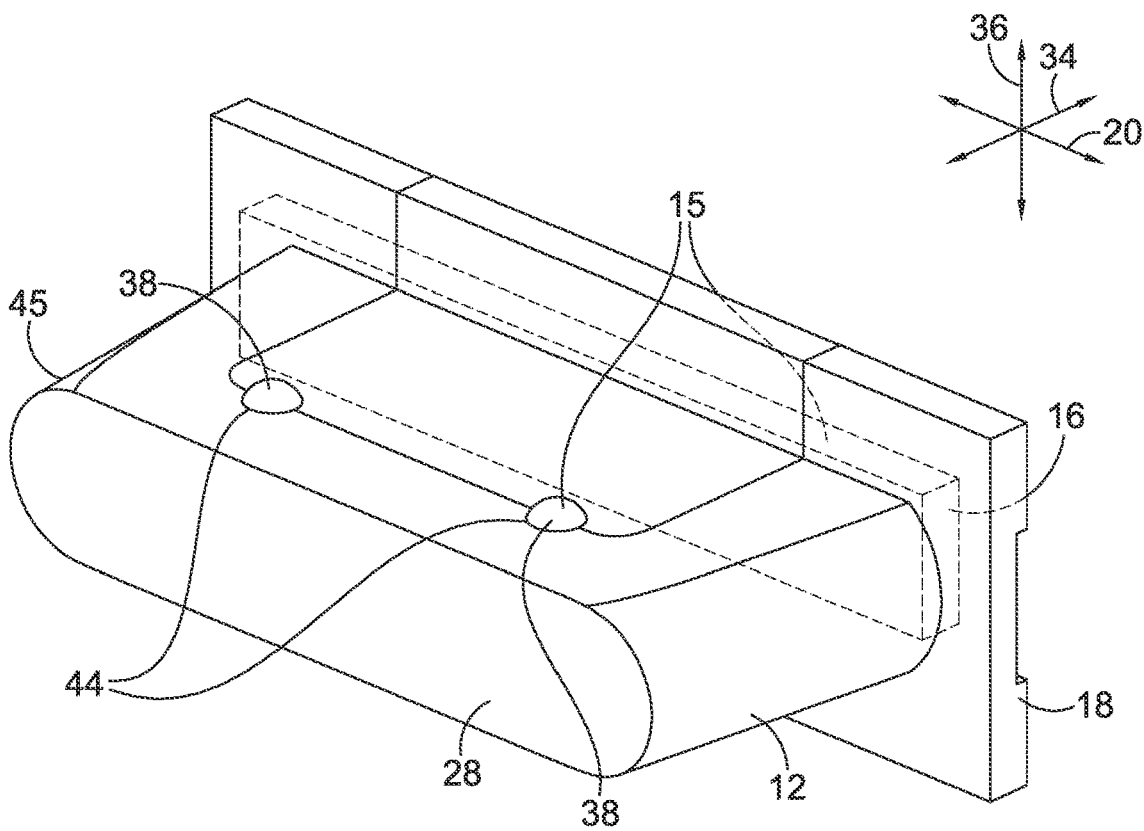

Looking at FIGS. 5A-5B, the latching element 12 is again shown, in accordance with an embodiment hereof. In FIG. 5A, the structure 16 is shifted within the structure 18 along the direction of the arrow shown in FIG. 5A. This actuates the ball-locking mechanism 15, thereby shifting the pair of balls 38 toward the inside of the enclosure 40. This "non-interference position" or "non-interference configuration" allows the latching element 12 to be inserted/removed with respect to the latching element 14. FIG. 5B shows the latching element 12 with the structure 16 released within the structure 18, or rather, with the ball-locking mechanism 15 in a natural, resting state. This results in the balls 38 shifting toward, and partially through, a pair of corresponding apertures or holes 44 formed in the enclosure 40. This places the balls 38 back into the "interference" position. Thus, the balls 38, being translated along the axis 34 within the latching element 14 as shown in FIGS. 4A-4C, are in interference with the locking feature 42. With the embodiment depicted in FIGS. 5A-5B, the structure 16 naturally biases the ball-locking mechanism 15 into the "interference position," due to the configuration of a biasing element located internal to the latching element 12, which is shown in more detail in FIGS. 7A-7B. However, in different embodiments, the opposite is contemplated. In addition, while a pair of balls 38 and a pair of corresponding apertures 44 are shown in FIGS. 5A-5C, any number of balls and corresponding apertures may be integrated into a latching mechanism in different embodiments. In addition, the structure defining the apertures 44 may be curved, contoured, or, e.g., conical shaped, to facilitate receiving of the balls 38, in different aspects. The balls 38 and apertures 44 may also, in different aspects, be positioned at different locations on the latching element 12, e.g., along the axis 20 or the axis 34 as shown in FIGS. 5A-5B. The balls 38 and apertures 44 may also, in different aspects, be located on one or multiple external surfaces of the latching element 12 (e.g., any or all of the surfaces on the latching element 12 shown in FIGS. 5A-5B). The balls 38 and apertures 44 may also, in different aspects, instead be located on interior surfaces of the latching element 14, with a corresponding locking feature being located on the latching element 12. In this sense, the locations of the elements of the ball-locking mechanism 15 shown in FIG. 2 may be flipped with respect to the latching elements 12, 14.

Figure 6A:
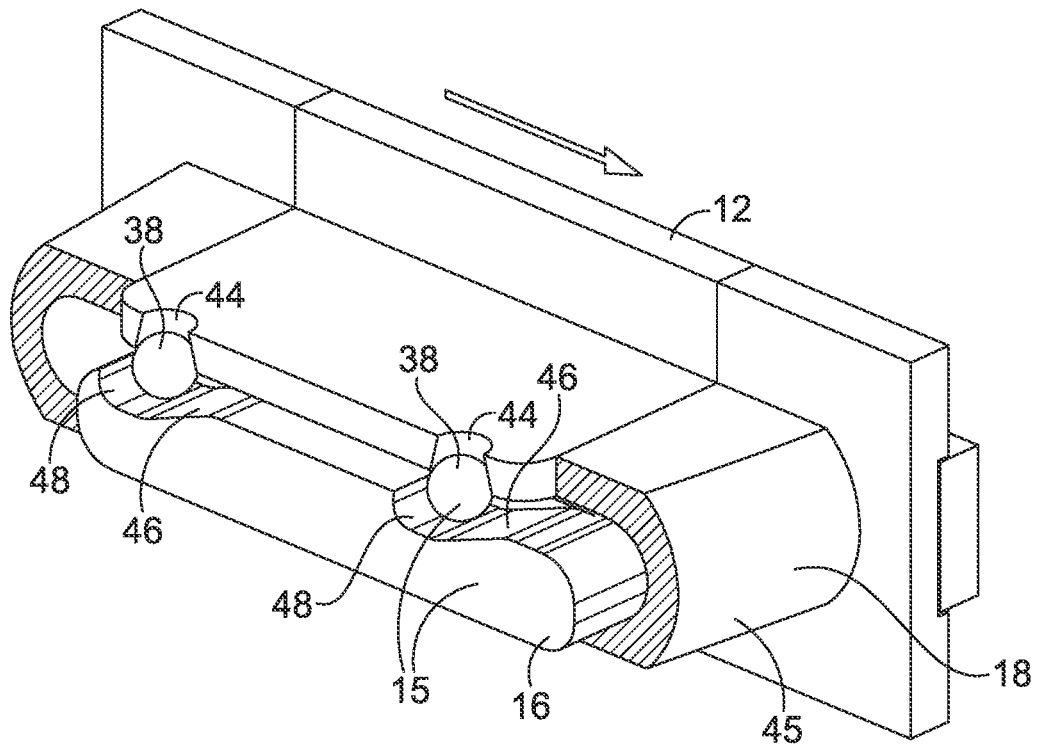
FIGS. 6A-6B depict a cutaway view of the latching mechanism of FIG. 1, in accordance with an embodiment hereof.
Figure 6B:
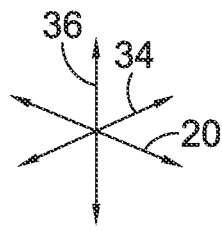
Figure 6B:
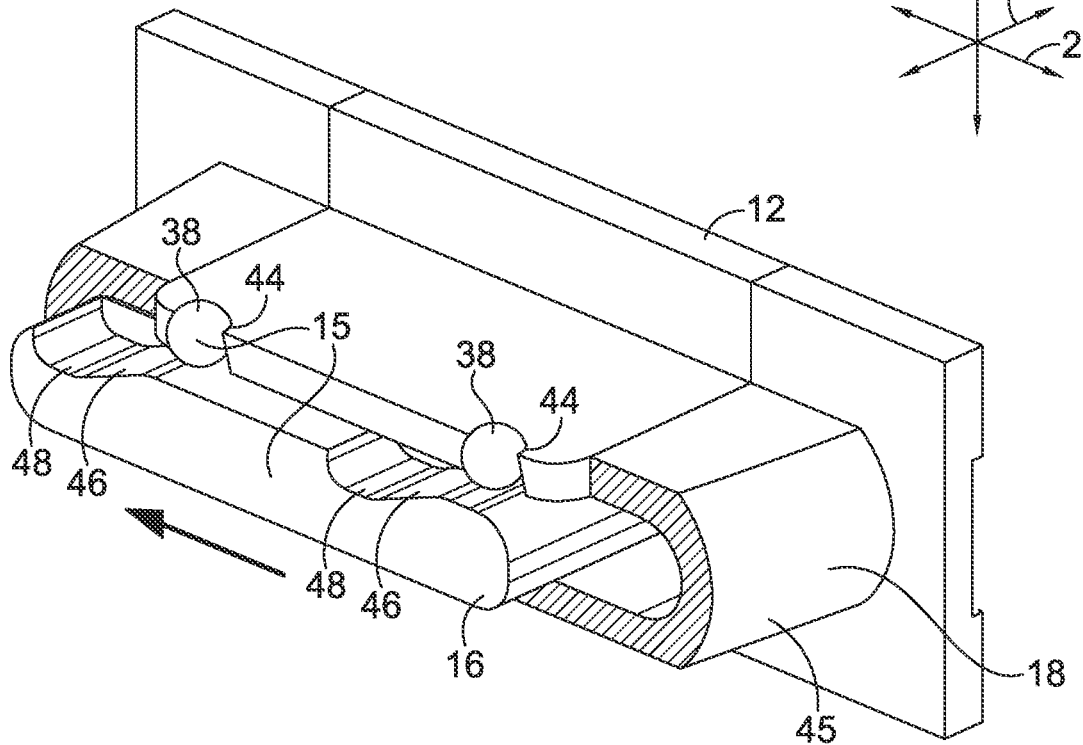

Looking at FIGS. 6A-6B, a cutaway, partially internal view of the latching element 12 is shown, in accordance with an embodiment hereof. FIG. 6A shows part of the structure 16 that is internal to the structure 18. The ball-locking mechanism 15 internal to the latching mechanism 10 is also shown in detail. Through this depiction, it can also be seen that the actuation of the ball-locking mechanism 15 occurs along the axis 20, i.e., perpendicular or transverse to the direction of insertion of the latching element 12, i.e., the axis 34. FIGS. 6A-6B depict how the latching element 12, and in particular, the structure 16 thereof, includes inclined surfaces 46. These inclined surfaces 46 of the structure 16 face towards an enclosure 45 formed by the structure 18. The balls 38 are each movably enclosed between the corresponding inclined surface 46, the corresponding aperture 44, and the enclosure 45. The balls 38 shift during operation of the ball-locking mechanism 15. In particular, the balls 38 shift when the structure 16 is shifted inside the structure 18. This allows the ball-locking mechanism 15 to translate between the "interference" position and the "non-interference" position, as discussed with respect to FIGS. 4A-4C. The inclined surfaces 46 are oriented to shift along the axis 20. Through this movement, the balls 38 shift along the inclined surfaces 46 facilitating operation of the ball-locking mechanism 15.

Figure 7A:
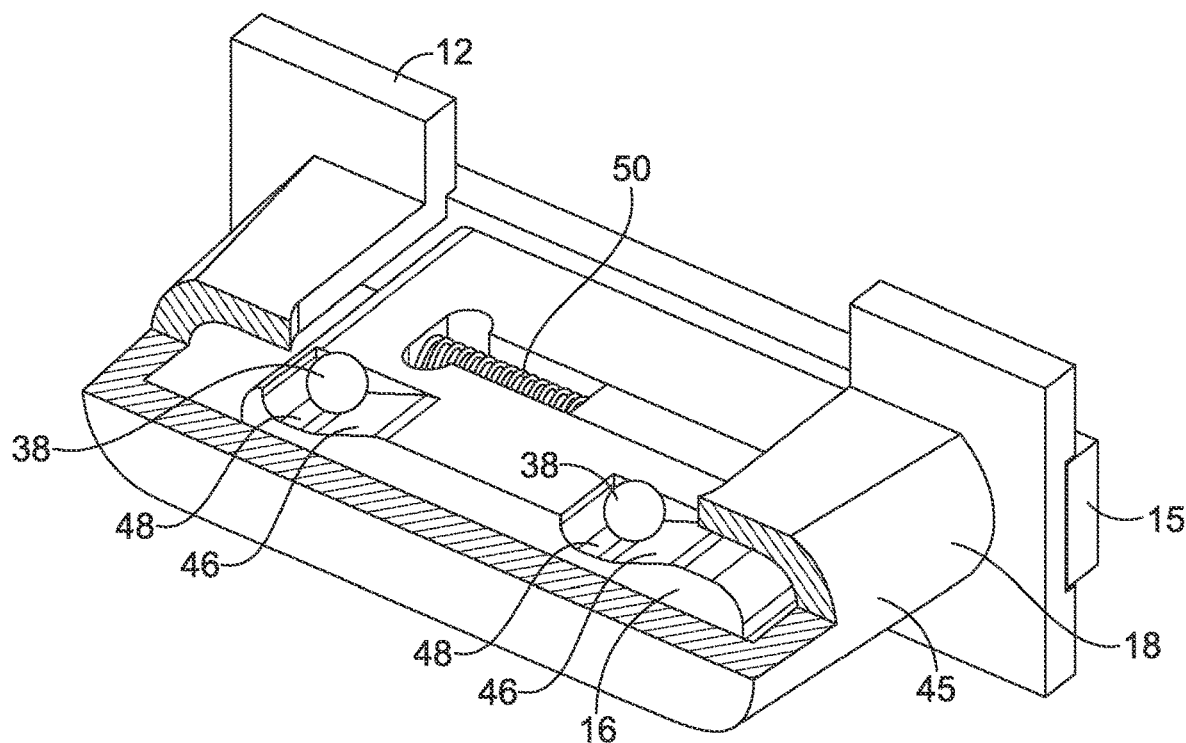
FIGS. 7A-7B depict a further cutaway view of the latching mechanism of FIG. 1, in accordance with an embodiment hereof.
Figure 7B:
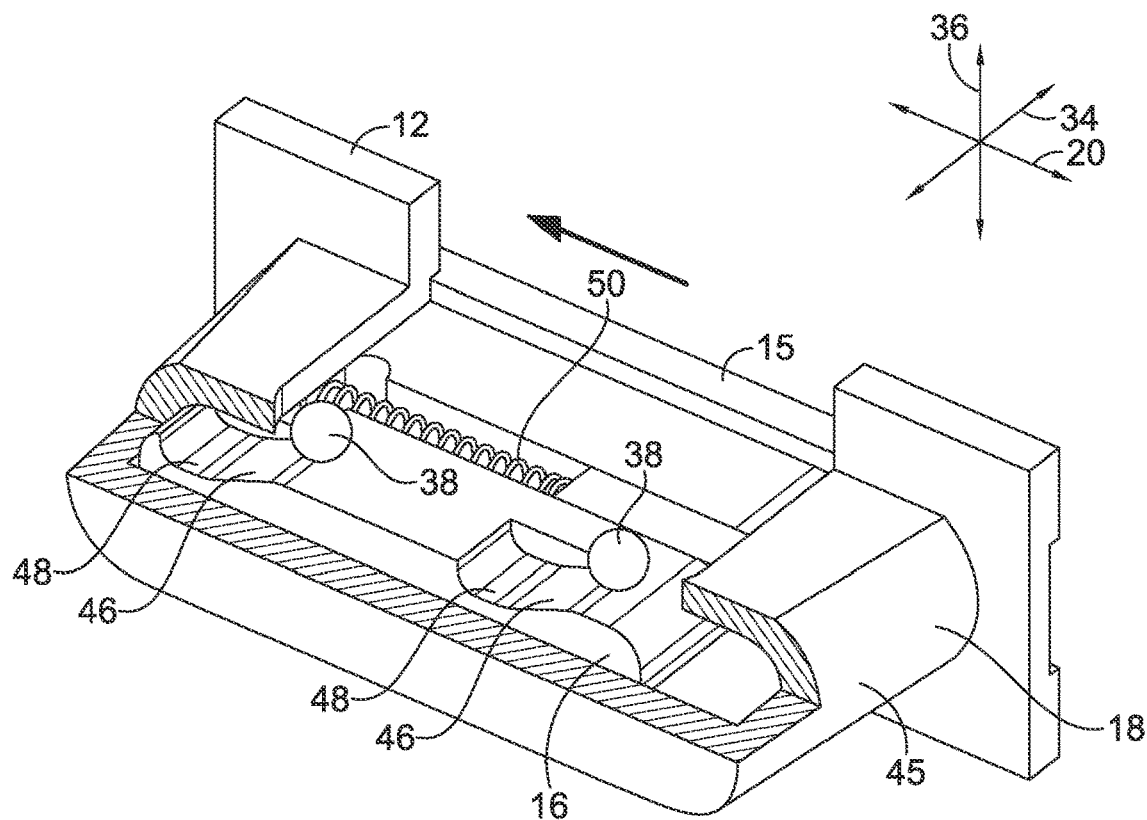

Looking at FIGS. 7A-7B, another cutaway, partially internal view of the latching element 12 is shown, in accordance with an embodiment hereof. FIGS. 7A-7B show, in part, the interior of the latching element 12, and in particular, the inclined surfaces 46 that form part of the structure 16 located within the latching element 12. The inclined surfaces 46 facilitate the shifting of the balls 38 into and out of the apertures 44 during operation of the ball-locking mechanism 15.

FIGS. 7A-7B further depict a biasing element 50 positioned between the structure 16 and the structure 18. The biasing element 50 shown in FIGS. 7A-7B is represented as a spring. However, other biasing elements, e.g., magnets, elastically-deformable components, integral flexures, and/or other mechanisms and/or materials, may be utilized to accomplish the biasing effect. The biasing element 50 naturally biases the structure 16 along the axis 20 toward the "interference" position, as shown in FIG. 7B, and as discussed in connection with FIGS. 4A-4C. The ball-locking mechanism 15 can be manipulated by shifting the structure 16 within the structure 18, along the axis 20, and against the force of the biasing element 50. This manipulation shifts the balls 38 out of the apertures 44, down the inclined surfaces 46, and into the recesses 48. This achieves the "non-interference position" in which the latching element 12 can be inserted into, or removed from, the latching element 14, as discussed in connection with FIGS. 4A-4C. Then, when the structure 16 is released, the biasing element 50 biases the structure 16 and by association the inclined surfaces 46 back along the axis 20, thereby shifting the balls 38 back into the apertures 44. This once again achieves the "interference position" in which the balls 38 interfere with the locking feature 42, as discussed in connection with FIGS. 4A-4C. In other contemplated aspects, the biasing element 50 and associated structures may be arranged so that transitioning between the "interference position" and "non-interference position" is accomplished with motion along an axis other than the axis 20 as shown in FIGS. 5A-5B. For example, in such configurations, this may be accomplished through translation along the axis 36, or through rotation about the axis 34, among others.

Figure 8A:
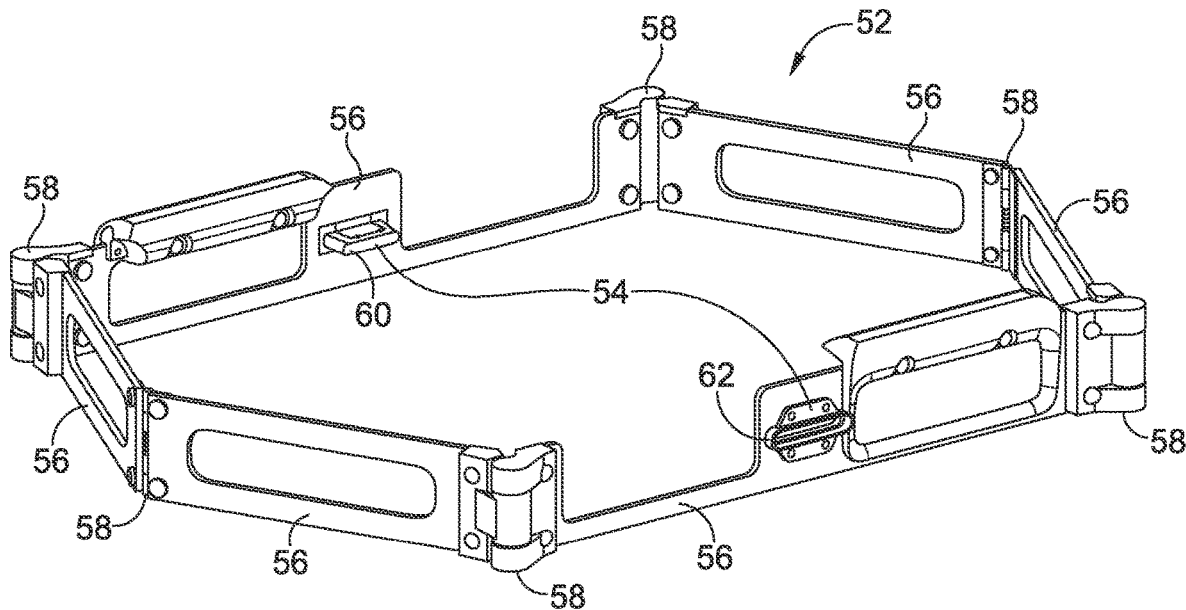
FIGS. 8A-8B depict a frame with a latching mechanism incorporated therein, in accordance with an embodiment hereof.
Figure 8B:
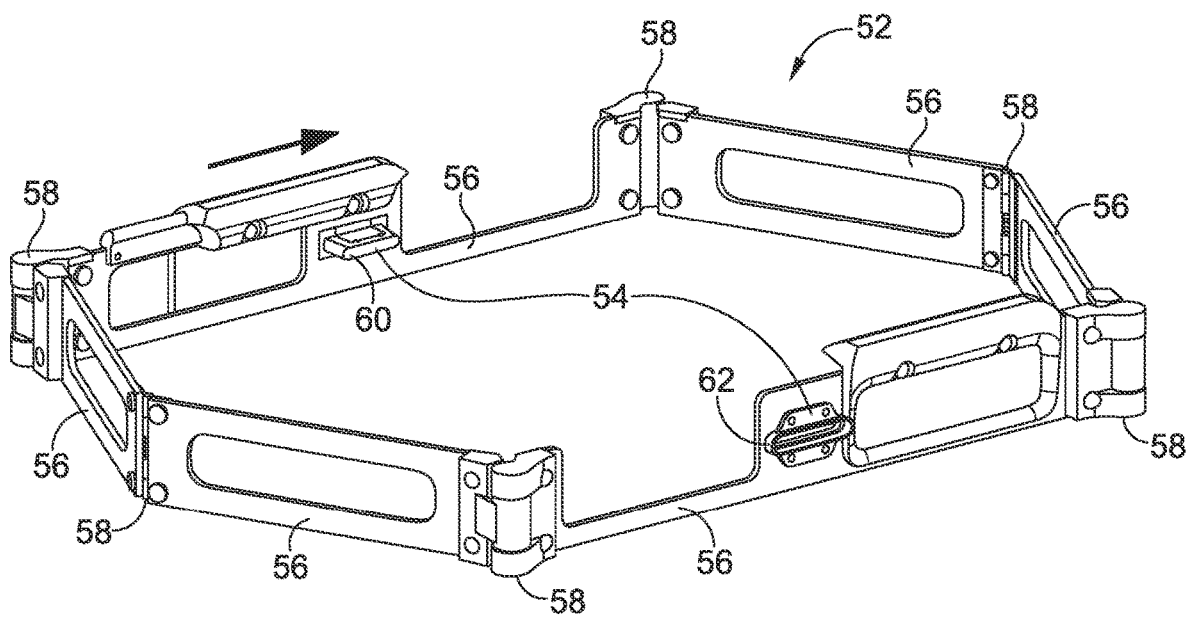

Looking at FIGS. 8A-8B, a frame 52 incorporating a latching mechanism 54 is shown, in accordance with an embodiment hereof. The frame 52 includes a plurality of rigid or semi-rigid elements 56 that are interconnected by hinges 58. The frame 52 may be coupled to a storage receptacle, e.g., such as the storage receptacle 64 shown in FIG. 9, among other possible storage receptacles of different sizes, shapes, and/or constructions. The frame 52 can be adjusted between a closed configuration, with the elements 56 generally abutting, and an open configuration, with the elements 56 generally spaced apart, e.g., as shown in FIGS. 8A-8B. In one aspect, the frame 52 may be coupled to a bag or other pliable storage enclosure. The frame 52 can then be manipulated, e.g., in manual fashion, automated fashion, or semi-automated fashion, to thereby open or close the bag or other pliable storage enclosure. The frame 52 shown in FIGS. 8A-8B includes rigid structures, or rigid points of contact, that allow it to be engaged, held, and adjusted between the closed configuration and the open configuration, e.g., by an automated or semi-automated mechanism. In this sense, the rigidity imparted by the frame 52 may enable, facilitate, and support automated processing operations by providing more predictable points of contact, and more predictable movements, compared to a pliable storage enclosure to which the frame 52 is coupled. The latching mechanism 54 shown in FIGS. 8A-8B includes a latching element 60 and a latching element 62. The latching elements 60, 62, like those of the latching mechanism 10, can be releasably secured to each other. In different embodiments, the latching elements 60, 62 may be elongated and contoured to facilitate insertion of the latching element 60 into the latching element 62 during an automated or semi-automated handling operation.

Figure 9:
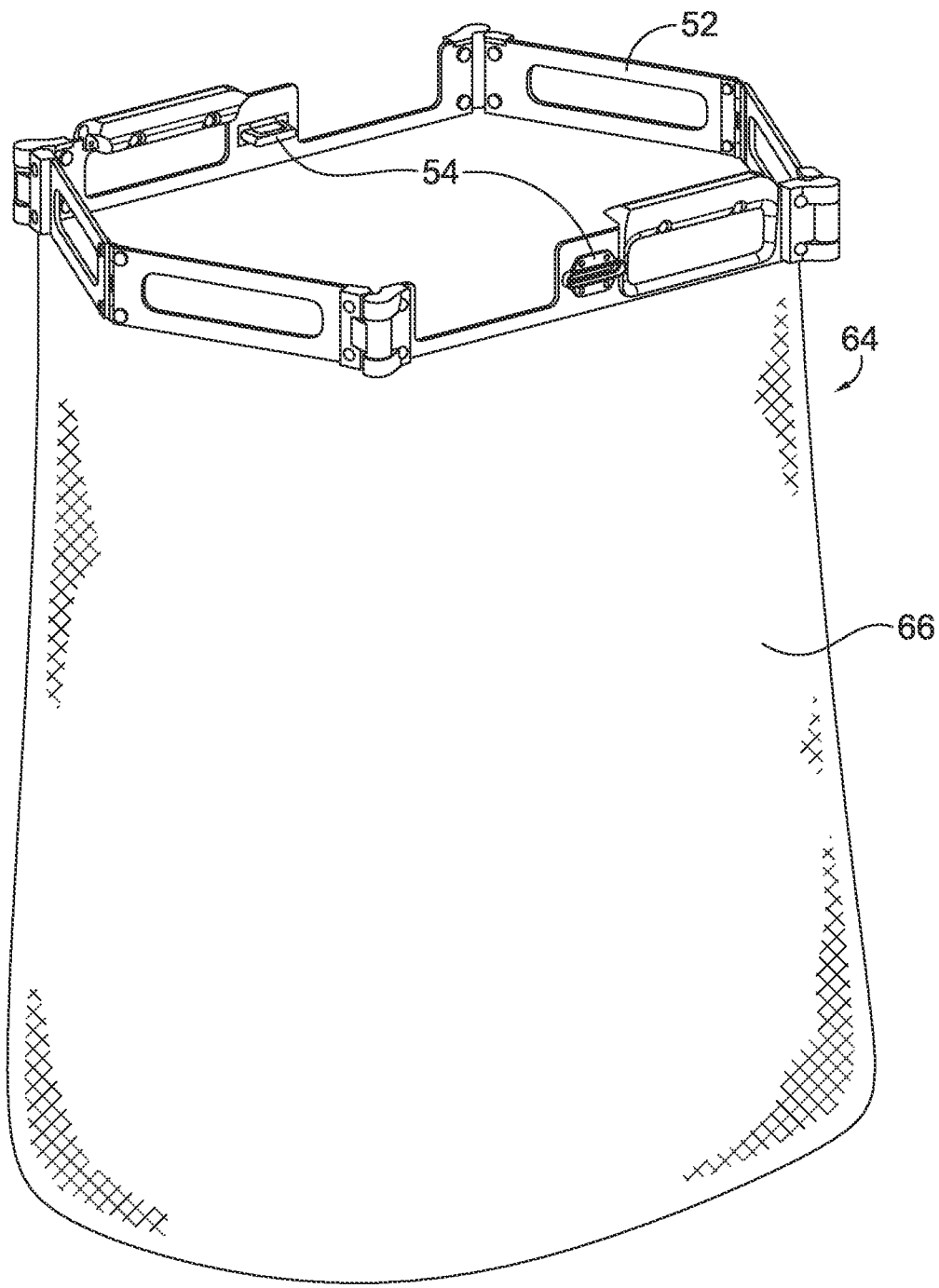
FIG. 9 depicts a storage receptacle with the frame shown in FIGS. 8A-8B, in accordance with an embodiment hereof.

Looking at FIG. 9, a storage receptacle 64 is shown, in accordance with an embodiment hereof. For the purposes of illustration, the storage receptacle 64 includes the frame 52 and the latching mechanism 54 shown in FIGS. 8A-8B. The frame 52 is coupled to a storage compartment 66 of the storage receptacle 64. The storage compartment 66 may be formed of one or more pliable or unstructured materials, or may be formed of materials that are partially pliable, or partially structured, in different aspects. The frame 52 imparts a rigid or semi-rigid feature to the storage receptacle 64. This supports ease of handling and manipulation in particular with automated or semi-automated handling systems. FIG. 9 depicts the frame 52 and the latching mechanism 54 coupled to a bag-like storage receptacle, but these elements could otherwise be coupled to numerous other storage receptacles of different sizes, shapes, and/or constructions, and/or those formed of rigid, non-rigid, and/or semi-rigid components and materials.

Figure 10:
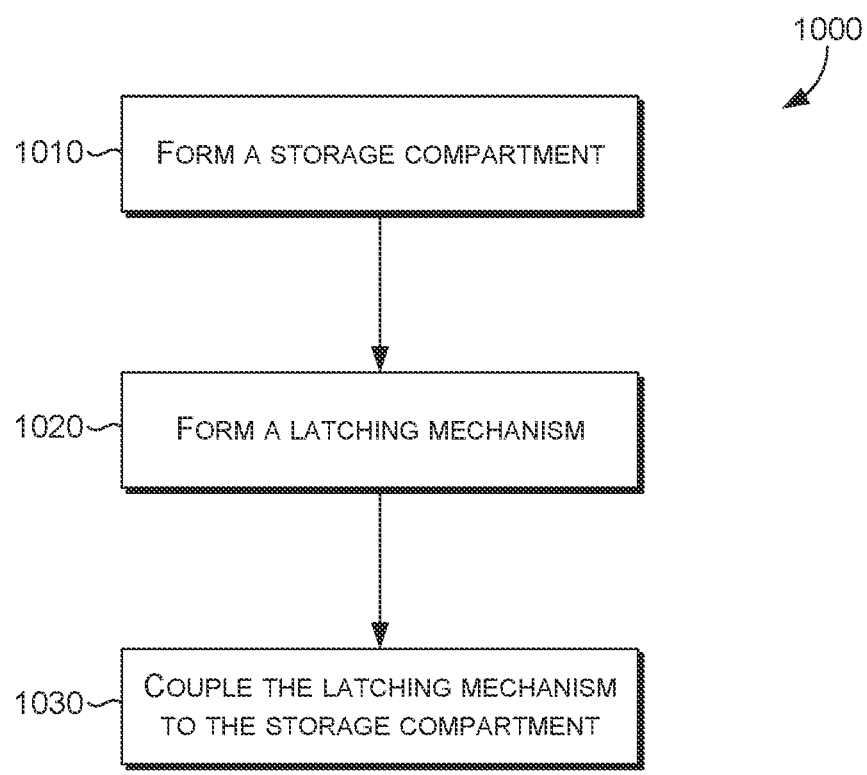
FIG. 10 depicts a block diagram of a method of manufacturing a storage receptacle, in accordance with an embodiment hereof.

Looking at FIG. 10, a block diagram of a method 1000 of manufacturing a storage receptacle is shown, in accordance with an embodiment hereof. The method 1000 includes blocks 1010-1030. In block 1010, the method includes forming a storage compartment, such as the storage compartment 66 shown in FIG. 9. In block 1020, the method includes forming a latching mechanism, such as the latching mechanism 10 shown in FIG. 1. The latching mechanism, as described herein, may include a first elongated latching element, such as the latching element 12 shown in FIGS. 1-3, and a second elongated latching element, such as the latching element 14 shown in FIGS. 1-3. In block 1030, the method includes coupling the latching mechanism to the storage compartment.

Embodiment 1. A latching mechanism comprising a first elongated latching element comprising a first structure and a second structure movably coupled to the first structure, the first structure comprising a first enclosure with a first aperture formed therethrough, the second structure positioned at least partially within the first structure and having an inclined surface that is oriented toward the first enclosure, a ball movably enclosed between the inclined surface, the first enclosure, and the aperture, and a biasing element coupled between the first structure and the second structure, wherein the biasing element imparts a biasing force along a first axis that is perpendicular to a second axis; and a second elongated latching element that is shaped to receive the first elongated latching element when the first elongated latching element is inserted into the second elongated latching element along the second axis, the second elongated latching element forming a second enclosure having an interior surface with a locking feature, wherein the biasing element biases the inclined surface along the first axis to thereby shift the ball into the aperture, such that a portion of the ball extends out of the aperture and into interference with the locking feature, and wherein a counteracting force applied to the biasing element shifts the ball out of the aperture and out of interference with the locking feature.

Embodiment 2. The latching mechanism of embodiment 1, wherein the aperture is conical-shaped.

Embodiment 3. The latching mechanism of any of embodiments 1-2, wherein the inclined surface is adjacent to a curved recess formed in the second structure, the curved recess shaped to receive the ball when the counteracting force is applied to the biasing element.

Embodiment 4. The latching mechanism of any of embodiments 1-3, wherein the second elongated latching element includes an opening with a first width, wherein the first elongated latching element includes a distal end with a second width, and wherein the first width is 1-5 millimeters greater than the second width.

Embodiment 5. The latching mechanism of any of embodiments 1-4, further comprising a separate aperture formed in the first enclosure; a separate inclined surface located on the second structure; and a separate ball coupled between the separate inclined surface, the separate aperture, and the first enclosure, wherein biasing of the second structure by the biasing element also shifts the separate ball into the separate aperture and into interference with the locking feature.

Embodiment 6. The latching mechanism of any of embodiments 1-5, wherein the biasing element is a spring.

Embodiment 7. The latching mechanism of any of embodiments 1-6, wherein the biasing element is a pair of magnets with same poles oriented towards each other.

Embodiment 8. The latching mechanism of any of embodiments 1-7, wherein the biasing element is an integral flexural mechanism.

Embodiment 9. The latching mechanism of any of embodiments 1-8, wherein the latching mechanism is coupled to a storage receptacle.

Embodiment 10. The latching mechanism of any of embodiments 1-9, wherein the storage receptacle is a bag formed from one or more pliable materials.

Embodiment 11. A storage receptacle comprising a storage compartment and a latching mechanism coupled to the storage compartment, the latching mechanism comprising a first elongated latching element comprising a first structure, and a second structure movably coupled to the first structure, the first structure comprising a first enclosure with a first aperture formed therethrough, the second structure positioned at least partially within the first structure and including an inclined surface that is oriented toward the first enclosure, a ball movably enclosed between the inclined surface, the first enclosure, and the aperture, and a biasing element coupled between the first structure and the second structure, wherein the biasing element imparts a biasing force along a first axis that is perpendicular to a second axis; and a second elongated latching element that is shaped to receive the first elongated latching element when the first elongated latching element is inserted into the second elongated latching element along the second axis, the second elongated latching element forming a second enclosure having an interior surface with a locking feature, wherein the biasing element biases the inclined surface along the first axis to thereby shift the ball into the aperture, such that a portion of the ball extends out of the aperture and into interference with the locking feature, and wherein a counteracting force applied to the biasing element shifts the ball out of the aperture and out of interference with the locking feature.

Embodiment 12. The storage receptacle of embodiment 11, wherein the storage compartment is at least partially formed of pliable material and includes an opening.

Embodiment 13. The storage receptacle of any of embodiments 11-12, further comprising a frame extending about the opening, wherein the latching mechanism is coupled to the frame.

Embodiment 14. The storage receptacle of any of embodiments 11-13, wherein the frame includes a plurality of rigid sections coupled together at a plurality of hinges.

Embodiment 15. The storage receptacle of any of embodiments 11-14, wherein the latching mechanism further comprises a separate aperture formed in the first enclosure; a separate inclined surface located on the second structure; and a separate ball coupled between the separate inclined surface, the separate aperture, and the first enclosure, wherein biasing of the second structure by the biasing element also shifts the separate ball into the separate aperture and into interference with the locking feature.

Embodiment 16. A method of manufacturing a storage receptacle, the method comprising forming a storage compartment; forming a latching mechanism comprising a first elongated latching element, comprising a first structure, and a second structure movably coupled to the first structure, the first structure comprising a first enclosure with a first aperture formed therethrough, the second structure positioned at least partially within the first structure and including an inclined surface that is oriented toward the first enclosure, a ball movably enclosed between the inclined surface, the first enclosure, and the aperture, and a biasing element coupled between the first structure and the second structure, wherein the biasing element imparts a biasing force along a first axis that is perpendicular to a second axis; and a second elongated latching element that is shaped to receive the first elongated latching element when the first elongated latching element is inserted into the second elongated latching element along the second axis, the second elongated latching element forming a second enclosure having an interior surface with a locking feature, wherein the biasing element biases the inclined surface along the first axis to thereby shift the ball into the aperture, such that a portion of the ball extends out of the aperture and into interference with the locking feature, and wherein a counteracting force applied to the biasing element shifts the ball out of the aperture and out of interference with the locking feature; and coupling the latching mechanism to the storage compartment.

Embodiment 17. The storage receptacle of embodiment 16, further comprising coupling a frame about an opening into the storage compartment, wherein coupling the latching mechanism to the storage compartment comprises coupling the latching mechanism to the frame.

Embodiment 18. The storage receptacle of any of embodiments 16-17, wherein the frame includes a plurality of rigid sections coupled together at a plurality of hinges.

Embodiment 19. The storage receptacle of any of embodiments 16-18, wherein the storage compartment is formed from at least one pliable material.

Embodiment 20. The storage receptacle of any of embodiments 16-19, further comprising coupling a handle to the frame, such that the handle is also coupled to the second structure, and is slidable along one of the plurality of rigid sections of the frame.

Embodiment 21. Any of the preceding embodiments 1-20 in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations and sub-combinations of elements, as well as use of elements not shown, are also possible and contemplated.

What is claimed is:

1. A latching mechanism, comprising:
   a first elongated latching element, comprising:
      a first structure, and
      a second structure movably coupled to the first structure,
         the first structure comprising a first enclosure with an aperture formed therethrough,
         the second structure positioned at least partially within the first structure and having an inclined surface that is oriented toward the first enclosure,
      a ball movably enclosed between the inclined surface, the first enclosure, and the aperture, and
      a biasing element coupled between the first structure and the second structure, wherein the biasing element imparts a biasing force along a first axis that is substantially perpendicular to a second axis; and
   a second elongated latching element that is shaped to receive the first elongated latching element when the first elongated latching element is inserted into the second elongated latching element along the second axis, the second elongated latching element forming a second enclosure having an interior surface with a locking feature,
      wherein the biasing element is configured to bias the inclined surface in a first direction along the first axis thereby shifting the ball along a third axis and into the aperture, such that at least a portion of the ball extends out of the aperture and into interference with the locking feature, and
      wherein the biasing element is configured such that a counteracting force applied to the biasing element shifts the ball out of the aperture and out of interference with the locking feature.

2. The latching mechanism of claim 1, wherein the aperture is conical-shaped.

3. The latching mechanism of claim 1, wherein the inclined surface is adjacent to a curved recess formed in the second structure, the curved recess shaped to receive the ball when the counteracting force is applied to the biasing element.

4. The latching mechanism of claim 1, wherein the second elongated latching element includes an opening with a first width, wherein the first elongated latching element includes a distal end with a second width, and wherein the first width is 1-5 millimeters greater than the second width.

5. The latching mechanism of claim 1, further comprising:
   a separate aperture formed in the first enclosure;
   a separate inclined surface located on the second structure; and
   a separate ball coupled between the separate inclined surface, the separate aperture, and the first enclosure, wherein the biasing element is configured to bias the separate inclined surface in the first direction along the first axis thereby shifting the separate ball along a third axis and into the separate aperture, such that at least a portion of the separate ball extends out of the separate aperture and into interference with the locking feature.

6. The latching mechanism of claim 1, wherein the biasing element is a spring.

7. The latching mechanism of claim 1, wherein the biasing element is a pair of magnets with same poles oriented towards each other.

8. The latching mechanism of claim 1, wherein the biasing element is an integral flexural mechanism.

9. The latching mechanism of claim 1, wherein the latching mechanism is coupled to a storage receptacle.

10. The latching mechanism of claim 9, wherein the storage receptacle is a bag formed from one or more pliable materials.

11. A storage receptacle, comprising:
a storage compartment; and
a latching mechanism coupled to the storage compartment, the latching mechanism comprising:
a first elongated latching element, comprising:
a first structure, and
a second structure movably coupled to the first structure,
the first structure comprising a first enclosure with an aperture formed therethrough,
the second structure positioned at least partially within the first structure and including an inclined surface that is oriented toward the first enclosure,
a ball movably enclosed between the inclined surface, the first enclosure, and the aperture, and
a biasing element coupled between the first structure and the second structure, wherein the biasing element imparts a biasing force along a first axis that is substantially perpendicular to a second axis; and
a second elongated latching element that is shaped to receive the first elongated latching element when the first elongated latching element is inserted into the second elongated latching element along the second axis, the second elongated latching element forming a second enclosure having an interior surface with a locking feature,
wherein the biasing element is configured to bias the inclined surface in a first direction along the first axis thereby shifting the ball along a third axis into the aperture, such that at least a portion of the ball extends out of the aperture and into interference with the locking feature, and
wherein the biasing element is configured such that a counteracting force applied to the biasing element shifts the ball out of the aperture and out of interference with the locking feature.

12. The storage receptacle of claim 11, wherein the storage compartment is at least partially formed of pliable material and includes an opening.

13. The storage receptacle of claim 12, further comprising a frame extending about the opening, wherein the latching mechanism is coupled to the frame.

14. The storage receptacle of claim 13, wherein the frame includes a plurality of rigid sections coupled together at a plurality of hinges.

15. The storage receptacle of claim 11, wherein the latching mechanism further comprises:
a separate aperture formed in the first enclosure;
a separate inclined surface located on the second structure; and
a separate ball coupled between the separate inclined surface, the separate aperture, and the first enclosure, wherein the biasing element is configured to bias the separate inclined surface in the first direction along the first axis thereby shifting the separate ball along a third axis and into the separate aperture, such that at least a portion of the separate ball extends out of the separate aperture and into interference with the locking feature.

16. A method of manufacturing a storage receptacle, the method comprising:
forming a storage compartment;
forming a latching mechanism comprising:
a first elongated latching element, comprising:
a first structure, and
a second structure movably coupled to the first structure,
the first structure comprising a first enclosure with an aperture formed therethrough,
the second structure positioned at least partially within the first structure and including an inclined surface that is oriented toward the first enclosure,
a ball movably enclosed between the inclined surface, the first enclosure, and the aperture, and
a biasing element coupled between the first structure and the second structure, wherein the biasing element imparts a biasing force along a first axis that is substantially perpendicular to a second axis; and
a second elongated latching element that is shaped to receive the first elongated latching element when the first elongated latching element is inserted into the second elongated latching element along the second axis, the second elongated latching element forming a second enclosure having an interior surface with a locking feature,
wherein the biasing element is configured to bias the inclined surface in a first direction along the first axis thereby shifting the ball second, opposite direction along the first axis and into the aperture, such that at least a portion of the ball extends out of the aperture and into interference with the locking feature, and
wherein the biasing element is configured such that a counteracting force applied to the biasing element shifts the ball out of the aperture and out of interference with the locking feature; and
coupling the latching mechanism to the storage compartment.

17. The method of manufacturing of claim 16, further comprising coupling a frame about an opening into the storage compartment, wherein coupling the latching mechanism to the storage compartment comprises coupling the latching mechanism to the frame.

18. The method of manufacturing of claim 17, wherein the frame includes a plurality of rigid sections coupled together at a plurality of hinges.

19. The method of manufacturing of claim 18, wherein the storage compartment is formed from at least one pliable material.

* * * * *

UNITED STATES PATENT AND TRADEMARK OFFICE
CERTIFICATE OF CORRECTION

| | | |
|---|---|---|
| PATENT NO. | : 12,043,456 B2 | |
| APPLICATION NO. | : 17/404849 | |
| DATED | : July 23, 2024 | |
| INVENTOR(S) | : Julian Leland Bell, Stephens B. Woodrough, Jr. and Justin Ashtiani | |

It is certified that error appears in the above-identified patent and that said Letters Patent is hereby corrected as shown below:

In the Claims

• Claim 5, Column 10, Line 55, "a third axis" should read -- the third axis --.

• Claim 15, Column 12, Line 1, "a third axis" should read -- the third axis --.

• Claim 16, Column 12, Lines 37-38, "second, opposite direction along the first axis" should read -- along a third axis --.

Signed and Sealed this
Twelfth Day of November, 2024

Katherine Kelly Vidal
*Director of the United States Patent and Trademark Office*